United States Patent
Vohra et al.

(10) Patent No.: US 6,890,509 B2
(45) Date of Patent: May 10, 2005

(54) PROCESS FOR RECOVERY OF LOW SODIUM SALT FROM BITTERN

(75) Inventors: Rajinder Nath Vohra, Gujarat (IN); Pushpito Kumar Ghosh, Gujarat (IN); Maheshkumar Ramniklal Gandhi, Gujarat (IN); Himanshu Labhshanker Joshi, Gujarat (IN); Hasina Hajibhai Deriya, Gujarat (IN); Rohit Harshadray Dave, Gujarat (IN); Koushik Halder, Gujarat (IN); Kishorkumar Manmohandas Majeethia, Gujarat (IN); Sohan Lal Daga, Gujarat (IN); Vadakke Puthoor Mohandas, Gujarat (IN); Rahul Jasvantrai Sanghavi, Gujarat (IN)

(73) Assignee: Council of Scientific & Industrial Research, New Delhi (IN)

( * ) Notice: Subject to any disclaimer, the term of this patent is extended or adjusted under 35 U.S.C. 154(b) by 286 days.

(21) Appl. No.: 10/062,583

(22) Filed: Jan. 31, 2002

(65) Prior Publication Data

US 2003/0143152 A1 Jul. 31, 2003

(51) Int. Cl.$^7$ ................................................ C01D 3/06

(52) U.S. Cl. ................................ 423/499.5; 423/499.4; 423/166; 423/197; 23/302 R; 23/303

(58) Field of Search .......................... 423/499.1, 499.4, 423/499.5, 166, 178, 197, 155; 23/295 R, 302 R, 303, 304

(56) References Cited

U.S. PATENT DOCUMENTS 3,586,090 A  *  6/1971  Henderson .................... 159/49
6,599,565 B1 *  7/2003  Umai et al. .................. 427/189

* cited by examiner

Primary Examiner—Ngoc-Yen Nguyen
(74) Attorney, Agent, or Firm—Dinesh Agarwal, P.C.

(57) ABSTRACT

A new process for recovery of Low Sodium Salt from bittern has been described in the present invention, the said process comprising desulphatation of bittern (by-product of salt industry), evaporation of bittern in solar pans and processing of solid mixture with water to produce a mixture of sodium and potassium chlorides and optionally preparing "free flowing" and iodized, by known techniques.

18 Claims, No Drawings

PROCESS FOR RECOVERY OF LOW SODIUM SALT FROM BITTERN

CROSS-REFERENCE TO RELATED APPLICATIONS

Not Applicable.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a process for recovery of low sodium salt from bittern in a cost-effective manner. Low sodium salt is primarily a mixture of sodium chloride and potassium chloride and is useful for those persons who have been advised to eat less common salt because of medical conditions like hypertension.

2. Description of the Related Art

It is known that potassium salt—a mineral found in many fruits, vegetables and legumes such as dried peas and beans—may protect against high blood pressure. Presence of potassium in low sodium salt inhibits sodium-induced hypertension. Reference may be made to "The Heinz Handbook of Nutrition" by Benjamin T. Burton, published for H. J. Heinz Co., by McGraw Hill Book Co. Second Edition, page 132–133, wherein it is mentioned that the dietary need for potassium roughly equals that of sodium. It is also stated that muscular weakness, increased nervousness and irritability, mental disorientation and cardiac irregularities manifest potassium deficiency. Many people, especially in poorer countries, do not have access to sufficient amounts of fresh fruits and vegetables with the result that their dietary needs of potassium have to be met by alternative means.

Since salt is being taken by people almost daily and it is consumed only in very limited quantity, it is an excellent carrier for micronutrients, an important example being iodised salt. Likewise, salt can be enriched with potassium chloride to provide the essential dietary needs. As a result, low sodium salt is gaining popularity although in most cases potassium content in the salt tends to be low. This is partly because of high cost of food grade potassium chloride, increases total cost of the product (see Table 1) thereby making it unaffordable to many.

Reference may be made to Alves de Lima et al. in patent no. BR 9806380 A, 12 Sep. 2000, entitled "Production of dietetic salt by mixing", wherein it is stated that low sodium dietetic salt is produced by mixing sea salt with potassium chloride, potassium iodate and sodium aluminium silicate, thereby mixing 4 parts of sodium chloride with 6 parts of potassium chloride. The drawback of this process is that one has to separately procure sodium chloride and potassium chloride and blend them together so as to make a solid mixture and also it is difficult to prepare a truly solid homogeneous mixture.

Reference may also be made to Shuqing Wang in patent no. CN 1271541 A, 1 Nov., 2000, entitled "Multi-element low-sodium nutritive salt", who disclosed the preparation of low sodium nutritive salt by crystallizing salt from saturated brine under vacuum. The salt is then mixed uniformly with salts like KCl and $MgSO_4.7H_2O$, followed by mixing with $KIO_3$ and $Na_2SeO_3$ solutions, drying and finally mixing with active Ca and Zn lactate. The drawback of this process is that apart from the difficulty of mixing various constituents in a homogeneous solid mixture, salt is to be crystallized from hot saturated brine involving high energy consumption thereby increasing the cost of production.

3. Objects of the Invention

The main object of the present invention is to provide a process for recovery of low sodium salt from bittern, which obviates the drawbacks as detailed above.

Another object of the present invention is to undertake such recovery through intermediate formation of crude carnallite which is a mixture of NaCl and the double salt $[KCl.MgCl_2.6H_2O]$ of KCl and $MgCl_2$. Crude carnallite can be obtained from low sulphate-containing bittern which may, in turn, be produced from naturally occurring brines of low sulphate content or can be obtained even from high sulphate-containing bitterns such as that obtained from sea brine or sub-soil brine through the desulphatation process described in the pending PCT patent Application No. PCT/IN01/00185 dated 22 Oct., 2001.

Yet another object of the present invention is to vary the composition of crude carnallite in solar pans such that NaCl and KCl in the final composition can be varied as per requirement.

Yet another object of the present invention is to show that valuable nutrients like calcium and magnesium can be introduced into the salt directly from bittern and there is no need of external addition of these nutrients.

Yet another object of the present invention is to prepare low sodium salt under ambient conditions of processing except the final drying of product in an oven.

Yet another object of the present invention is to treat low sodium salt with suitable additives to impart free flowing properties to the salt and for iodisation of the salt by known methods.

BRIEF SUMMARY OF THE INVENTION

The present invention relates to recovery of low sodium salt from bittern which is a by-product of salt industry. The process involves treatment of bittern with calcium chloride to precipitate calcium sulphate, solar evaporation of desulphated bittern in crystallizers to produce a solid mixture of sodium chloride and carnallite and processing the said mixture with water to produce low sodium salt. This is dried and treated with additives to give free flowing properties. In a variation of the process, brine can be desulphated prior to crystallization of common salt as described in the pending PCT patent Application No. PCT/IN01/00185 dated 22 Oct. 2001.

Accordingly the present invention provides a process for the preparation of low sodium salt which comprises (i) treatment of bittern of density 29° Be' to 30° Be' containing sulphate in the range of 20 to 65 g/L with calcium chloride—which is obtained from any of the sources/methods described in the pending PCT patent Application No. PCT/IN01/00185 dated 22 Oct., 2001, with concentration of calcium chloride ranging from 80 g/L to 450 g/L and in the mol ratio of 0.9 to 1.1 moles of calcium chloride to one mole of sulphate in bittern to produce calcium sulphate; (ii) separating calcium sulphate from desulphated bittern; (iii) evaporating desulphated bittern containing 90 to 135 g/L of sodium chloride and 20 to 25 g/L of potassium chloride, in solar pans till density ranging from 30 to 33.0° Be' is reached, with deposition of excess salt, in pans; (iv) separating excess salt from concentrated bittern by decantation; (v) evaporating further this bittern in a second set of solar pans till density of 35.5° Be' is reached, with deposition of the desired mixture of sodium chloride and carnallite ($KCl.MgCl_2.6H_2O$), in pans; (vi) scraping and heaping the solid mixture and draining out the mother liquor; (vii) treating solid mixture with water in the ratio of 0.3 to 0.5 parts of water with one part of solid mixture in a stirred vessel for a period in the range of 20 to 60 minutes thereby producing a solid, which is low sodium salt, and a liquid in equilibrium with this solid; (viii) separating the solid product from the liquid in a centrifuge; (ix) recycling the liquid containing dissolved magnesium chloride and 30 to 55 g/L of sodium and potassium chlorides to carnallite pans for enhanced recovery of sodium and potassium salts; (x) drying low sodium salt at a temperature ranging from 90° C. to 130° C. by known techniques; (xi) treating dried material with 25 to 50 ppm of potassium iodate and 0.01% to 0.05% w/w light magnesium carbonate or in situ generating magnesium carbonate from the reaction of sodium carbonate and residual $MgCl_2$ in the salt in order to make the material free flowing.

In an embodiment of the present invention bittern is treated with required quantity of calcium chloride such that the concentration of sulphate in bittern of 29–30° Be' after treatment is reduced to the levels of 1–15 g/L to promote carnallite formation.

In yet another embodiment of the present invention desulphated bittern may be evaporated in solar pans for adequate period till density reaches to a levels in the range of 30 to 33° Be' when excess salt is separated from concentrated bittern.

In yet another embodiment of the present invention, the desulphated bittern may be further evaporated in solar pans for adequate period till the density to a levels in the range of 34.5° Be' to 36° Be' is reached thereby depositing a mixture containing sodium chloride and carnallite.

In yet another embodiment of the present invention, the solid mixture is treated with 0.3–0.5 kg water/kg of crude solid mixture to decompose the carnallite and the resultant dry solid, free from liquid, is obtained by centrifugation and subsequent oven drying.

In yet another embodiment of the present invention, the solid composition of NaCl/KCl is treated by known techniques with appropriate micronutrient additives and free flow aids as required to impart the final desired characteristics to the product.

DETAILED DESCRIPTION OF THE INVENTION

Bittern, a by-product of salt industry, having a density of 29–30° Be' is treated with calcium chloride as described in the pending PCT patent application No. PCT/IN01/00185 dated 22 Oct., 2001.

Desulphated bittern is taken into a solar pan where it undergoes evaporation with the deposition of common salt and density of bittern is raised. The density to which bittern is required to be raised depends upon quantity of excess salt required to be removed by solar evaporation which further depends upon the desired composition of potassium chloride and sodium chloride in the final product. This composition may range from 20% KCl to 70% KCl which is equivalent to density of bittern in this crystallizer to be in the range from 30.5° Be' to 33° Be'. After removal of excess salt bittern is taken to carnallite crystallizer pans where mixture of carnallite ($KCl.MgCl_2.6H_2O$) and sodium chloride crystallizes out in the density range 33 to 36° Be'.

The mixture of carnallite double salt and sodium chloride is treated with 0.3–0.5 kg water/kg of solid mixture in a stirred vessel as per known procedure to decompose the double salt and produce a solid mixture of sodium chloride and potassium chloride. The solid-liquid mixture is centrifuged and the supernatant liquid, comprising mainly $MgCl_2$ and some (30–55 g/L) dissolved potassium chloride and sodium chloride is recycled to the carnallite pan to recover residual quantity of potassium chloride and sodium chloride.

The solid residue obtained after centrifugation is dried in a tray drier at a temperature between 90–130° C., treated with 0.01–0.05% light magnesium carbonate (100–150 g/L density) and dried to make the same free flowing. If required, the low sodium salt may be iodized with aqueous $KIO_3$ solution (10–50 ppm I) to make it saleable as free flowing iodized low sodium salt.

In the field of chemical technology the recovery of low sodium salt from bittern, a by-product of salt industry, has assumed importance on account of its nutritive value. The process involves chemical treatment of bittern with $CaCl_2$-containing distiller by-product waste of soda ash industry or pure calcium chloride, to separate sulphate; concentrating bittern in solar pans to produce mixture of salt and carnallite and finally processing the mixture to produce low sodium salt. This salt is optionally made free flowing and iodized with suitable additives.

The present invention discloses the preparation of low sodium salt containing different proportions of NaCl and KCl directly from brine/bittern in solar pans and it obviates the need of any external addition of food grade KCl and other nutrients in salt. The inventive steps adopted in the present invention are: (i) realization that desulphated bittern of density 29–30° Be' that yields a mixture of sodium chloride and carnallite upon further evaporation can be a source for recovery of low sodium salt directly, (ii) control of bittern density of desulphated bittern and charging of carnallite pan in a manner so as to adjust NaCl content in crude carnallite mixture, (iii) decomposition of the double salt in the solid mixture in a manner so as to achieve the NaCl/KCl mixture of desired ratio with highest possible yield, (iv) simple method of industrial centrifugation to yield low sodium salt composition with desired purity without any need for washing of the solid, and (v) recycling of the supernatant into carnallite pan so as to maximize yield of low sodium salt from given quantity of bittern.

The following examples are given by way of illustration and therefore should not be construed to limit the scope of the present invention.

EXAMPLE 1

In this example 35 L of bittern of subsoil source, with density 29° Be' and having the following chemical analysis: $Mg^{2+}$=48.0 g/L; $Ca^{2+}$=0.5 g/L; $Na^+$=37 g/L (95 g/L as NaCl); $K^+$=11.2 g/L (21.5 g/L as KCl); $Cl^-$=191.1 g/L; $SO_4^{2-}$=26.7 g/L (0.278 M) was used for the production of low sodium salt. This bittern containing 9.73 moles of $SO_4^{2-}$ was desulphated by using 9.75 moles of $Ca^{2+}$ [(2.46 L of calcium chloride solution (obtained by dissolution of limestone and hydrochloric acid) containing 440 g/L $CaCl_2$]. After removal of gypsum, desulphated bittern is evaporated to a density of 35.5° Be'. 7 kg of crude carnallite containing a mixture of sodium chloride and carnallite was separated out. Crude carnallite had the following chemical composition: $Mg^{2+}$=5.46%; $Ca^{2+}$=0.35%; $Na^+$=16.69% (42.09% as NaCl); $K^+$=5.26% (10.05% as KCl); $Cl^-$=47.49%; $SO_4^{2-}$ 0.38%; $H_2O$=24.4%.

The total material was treated with 2.8 L of water in a stirred vessel and stirring continued for 30 min. The supernatant solution was decanted and the solid residue, weighing 2.61 kg, had the following chemical analysis after filtration: $Mg^{2+}$=0.52%; $Ca^{2+}$=0.55%; $SO_4^{2-}$=0.4%; NaCl=76.1%; KCl=21.5%.

The volume of the supernatant was 4.02 L and contained mainly $MgCl_2$ besides small quantities of NaCl and KCl. This liquid is evaporated to 35.5° Be' and the carnallite obtained was processed in similar manner as above to obtain an additional 0.4 kg of low sodium salt. Overall recovery on KCl basis worked out to be nearly 87%.

EXAMPLE 2

In this example the experiment was conducted in the field using bittern of sub-soil origin and utilizing solar energy for evaporation in shallow pans lined with thin gauge plastic to avoid percolation loss. 1500 L of the bittern of Example 1 having total sulphate content of 417 moles was processed for this purpose. The bittern was desulphated using sulphate equivalent of calcium chloride solution of concentration as in Example 1. After removal of gypsum, the desulphated bittern was added into solar pans and left for evaporation up to 32.5° Be.' The bittern is allowed to evaporate further in a second pan where a mixture of carnallite and sodium chloride weighing 205 kg is deposited at a liquid density of 35.5° Be'. This mixture had the following chemical analysis of the main components: $Mg^{2+}$=7.81%; $Na^+$=6.34%; $K^+$=7.37%; $Cl^-$=39.38%.

The above solid after separation from end bittern is treated with 82 L of water in a stirred vessel for one hour and centrifuged when practically the entire magnesium goes into the supernatant liquid (180 L) along with some fraction of sodium and potassium chlorides, and 55 kg of low sodium salt of following composition is obtained: $Mg^{2+}$=0.57%; $Ca^{2+}$=0.35%; $SO_4^{2-}$=0.25%; NaCl=53.58%; KCl=44.52%.

The supernatant liquid is evaporated in solar pans in similar manner as in Example 1 and solid deposited is processed with water as before to recover 6.0 kg of additional low sodium salt giving a total yield of 61 kg.

EXAMPLE 3

In this example high sulphate bittern of sea water origin was used for low sodium salt preparation. Chemical analysis of this bittern is given below: $Mg^{2+}$=50.45 g/L; $Ca^{2+}$=0.41 g/L; $Na^+$=37.39 g/L (95 g/L as NaCl); $K^+$=13.90 g/L (26.5 g/L as KCl); $Cl^-$=167.33 g/L; $SO_4^{2-}$=66.80 g/L.

Bittern was desulphated with calcium chloride obtained as liquid distiller by-product from soda ash industry. Analysis of the liquid by-product is given below: Water=834 g/L; $Na^+$=26.03 g/L; $Ca^{2+}$=55.47 g/L; $Cl^-$=132.4 g/L; $OH^-$=2.8 g/L; $CaCO_3$=9.96 g/L; $CaSO_4$=2.49 g/L; MgO=3.74 g/L. The above distiller by-product was settled to remove suspended impurities and a clear liquid supernatant was obtained containing 66 g/L and 128.7 g/L NaCl and $CaCl_2$, respectively.

1500 L of 29° Be' bittern (containing a total of 1044 moles $SO_4^{2-}$) was treated with 900 L of the settled distiller by-product (containing a total of 1044 moles $CaCl_2$) in a plastic-lined solar pan. Mixed liquid was allowed to evapo rate in the pan, to ensure complete deposition of calcium sulphate till density of 29° Be' was achieved again. Clear liquid from mixing pan was transferred to second pan which was also lined with plastic lining and was allowed to evaporate till liquid density of 35.5° Be' as achieved. 300 kg of solid which was a mixture of sodium chloride and carnallite was separated from end bittern. The chemical analysis of solid mixture is given below: $Mg^{2+}$=6.0%; $Ca^{2+}$=0.35%; $SO_4^{2-}$=0.4%; $Na^+$=16.31% (41.45% as NaCl); $K^+$=5.79% (11.05% as KCl). The solid mixture was treated with 135 L of water in a stirred vessel for one hour and centrifuged. 240 L of supernatant liquid and 120 kg of low sodium salt with the composition: $Mg^{2+}$=0.3%; $Ca^{2+}$=0.4%; NaCl=74.3%; KCl=22.2% were obtained.

EXAMPLE 4

In this example low sodium salt as produced above was treated with potassium iodate and light magnesium carbonate in order to provide free flowing properties to salt. Accordingly 60 kg of low sodium salt was first dried at 110° C. and after pulverization was treated with 3 g of potassium iodate (in the form of a 10% solution), followed by 12 g of light magnesium carbonate and was immediately packed tightly in bags.

The main advantages of the present invention are:

(1) The homogeneous mixture of sodium chloride and potassium chloride, which constitutes low sodium salt, can be produced directly from 29–30° Be' bittern instead of producing such salt through artificial mixing of the two solids as presently undertaken.

(2) The ratio of potassium chloride and sodium chloride can be adjusted in the range from 20% KCl to 70% KCl according to customer requirements by varying the baume density at which the carnallite crystallizer pan is charged.

(3) The process involves no heating or cooling except final drying of product in an oven and the production of crude carnallite is carried out under ambient conditions with the help of solar energy while subsequent processing of the carnallite for recovery of low sodium salt is also carried out under ambient conditions.

(4) Other nutrients like calcium and magnesium which are beneficial in small amounts are drawn from bittern itself and need not be added from outside.

(5) The supernatant liquor remaining after formation of low sodium salt can be recycled in the carnallite pan to boost yield of the process.

(6) A variety of calcium ion-containing raw material can be used for the desulphatation of bittern required for carnallite production when the bittern contains high levels of sulphate.

(7) Compared to the high cost of production of low sodium salt by conventional route as shown in Table 1, the low sodium salt can be produced at considerably lower cost by the method of the present invention, especially when produced from sub-soil bittern as illustrated in Table 2 and/or when distiller by-product of soda ash industry, after clarification, is used as calcium chloride source which would greatly reduce the calcium chloride raw material cost in Table 2 and/or when low sodium salt is produced by salt manufacturers who would have bittern available at no cost since it is mostly being discharged as waste.

TABLE 1

ESTIMATED COST OF PRODUCTION FOR 3000 TONS/ANNUM LOW SODIUM SALT BY CONVENTIONAL PROCESS OF MIXING NaCl and KCl (55% NaCl; 45% KCL)

| Raw Material | Quantity Required/ton | Rate in Indian Rupees/ton | Annual cost in Rupees/M |
|---|---|---|---|
| Sodium Chloride | 1650 | 1,000 | 1.65 |
| Potassium Chloride (Food grade) | 1350 | 20,000 | 27.00 |
| Other costs: | | | |
| (including cost of mixing, depreciation on machinery, etc.) | | 1,000 | 3.00 |
| Total cost for 3000 tons | | | 31.65 |
| Cost of production per ton | | | Rs. 10,550 |

TABLE 2

ESTIMATED COST OF PRODUCTION FOR 3000 TONS/ANNUM LOW SODIUM SALT (55% NaCl; 45% KCL) FROM SUB-SOIL AND SEA BITTERNS UNDER INDIAN CONDITIONS

| Raw Material | Quantity Required | Rate | Cost in Rs./M |
|---|---|---|---|
| Bittern | 80,000 M³ | — | 2.4 |
| Calcium chloride | 2400 tons (sub-soil bittern) | 3500/ton | 8.40 |
| (on CaCl$_2$.2H$_2$O basis) | 6000 tons (sea bittern) | " | 21.00 |
| Utilities | | | |
| Power | 3,55,200 KWH | @ Rs. 4/— KWH | 1.42 |
| LDO for drying | 12,223 L | @ Rs. 18/L | 0.22 |
| Water | 8,000 m³ | @ Rs. 20/m³ | 0.16 |
| Field Labour | 5,500 man days | @ Rs. 75/ man day | 0.42 |
| Supervisory Staff | | | 0.30 |
| Other costs | | | |
| Depreciation on plant and machinery (without liner) | | | 0.35 |
| Repair/replacement cost of liner for carnallite pan (assuming the life of liner to be 2 years) | | | 0.75 |
| Interest on capital investment | | @ 12% per annum | 0.66 |
| Total cost (Rs/M) | | | |
| (Sub-soil bittern) | | | 15.08 |
| (Sea bittern) | | | 27.68 |
| Cost of Low Sodium Salt per ton | | | (in Rupees) |
| From Sub-soil bittern | | | 5027 |
| From Sea bittern | | | 9227 | e) feeding the concentrated desulphated bittern of step (d) to carnallite pans and continuing the evaporation to cause the deposition of a solid mixture, f) separating the solid mixture of step (e) constituting a mixture of sodium chloride and carnallite (KCl.MgCl$_2$.6H$_2$O) from carnallite pans for obtaining liquid bittern, g) treating with stirring the solid mixture of step (f) with water for a period of 20–60 minutes to produce low sodium salt solid and a liquid bittern in equilibrium with low sodium salt, containing mainly magnesium chloride with dissolved sodium chloride and potassium chloride, h) separating the solid from the liquid bittern of step (g) by centrifugation, and obtaining supernatant liquor, i) drying the solid of step (h) at a temperature ranging from 90–130° C. to obtain low sodium salt, j) recycling the supernatant liquor of step (h) to the carnallite pans for recovery of sodium and potassium salt in the presence of an additive, and

We claim:

1. A process for recovery of low sodium salt from bittern, comprising the steps of:
    a) treating the bittern with calcium chloride solution to produce insoluble calcium sulfate,
    b) separating calcium sulfate of step (a) to obtain desulphated bittern,
    c) evaporating the desulphated bittern of step (b) in solar pans until a density ranging from 30 to 33° Bé is reached, with deposition of salt in pans,
    d) removing the salt deposit in step (c) to obtain concentrated desulphated bittern,
    k) treating the dried product of step (i) with an alkali salt and an additive to obtain an iodised low sodium salt.

2. A process as claimed in claim 1, wherein treating low-sodium salt of step (i) with an alkali iodate salt to obtain iodized low sodium salt.

3. A process as claimed in claim 1, wherein recovery of low-sodium salt is enhanced by recycling the supernatant liquor of step (h) to the carnallite pans.

4. A process as claimed in claim 1, wherein the low sodium salt is produced from 29–30° Be' bittern of step (a) containing sodium chloride, potassium chloride and Mg$^{2+}$.

5. A process as claimed in claim 1, wherein in step (a) the source for bittern is seawater, sub oil origin, or bittern having a low sulphate content.

6. A process as claimed in claim 1, wherein in step (a) the concentration of calcium chloride solution used is in the range of 80–450 g/liter.

7. A process as claimed in claim 1, wherein in step (a) the source of calcium chloride is from distiller by product waste of soda ash industry.

8. A process as claimed in claim 1, wherein in step (b) the desulphated bittern has a concentration of sodium chloride 90–135 g/liter and potassium chloride 20–25 g/liter.

9. A process as claimed in claim 1, wherein in step (c) the ratio of potassium chloride and sodium chloride is adjusted in the range of 20% KCl to 70% KCl by varying between 30 to 33° Be' the density of desulphated bittern.

10. A process as claimed in claim 1, wherein in step (e) the evaporation of concentrated desulphated bittern is performed to achieve a density of 35.5° Be'.

11. A process as claimed in claim 1, wherein in step (g) the ratio of water to the solid mixture ranges from 0.30–0.50 to 1.00.

12. A process as claimed in claim 1, wherein steps (a) to (h) are carried out at an ambient temperature and step (i) is carried out at a temperature range of 90–130° C.

13. A process as claimed in claim 1, wherein in step (j) the additive used is light magnesium carbonate at a concentration range of 0.01–0.05% w/w with respect to low-sodium salt.

14. A process as claimed in claim 1, wherein in step (k) the alkali salt used is potassium iodate at a concentration range of 10–50 ppm with respect to low sodium salt.

15. A process as claimed in claim 1, wherein the supernatant liquor of step (h) is recycled to the carnallite pans to increase yield of the process to 87–90% based on potassium content of the bittern used.

16. A process as claimed in claim 1, wherein in step (k), the low sodium salt having calcium and magnesium ranging in the amount 0.01 to 2.0% is drawn from the bittern used and not to be externally added.

17. A process as claimed in claim 1, wherein the yield of low sodium salt from bittern is in the range of 0.03 kg/liter to 0.07 kg/liter.

18. A process as claimed in claim 1, where the yield of low sodium salt from bittern after step (j) is in the range of 0.04 kg/lt to 0.09 kg/lt.

* * * * *